Figure 1:
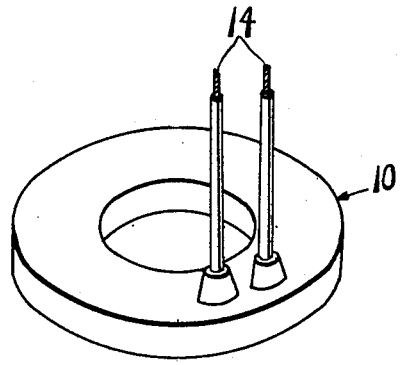

Sept. 20, 1955            D. SHERK            2,718,577

ELECTRIC HEATING DEVICES

Filed Feb. 13, 1953            3 Sheets-Sheet 1

INVENTOR.
DONALD SHERK
BY *Michael Williams*
ATTORNEY

Sept. 20, 1955　　　　　　　D. SHERK　　　　　　　2,718,577
ELECTRIC HEATING DEVICES
Filed Feb. 13, 1953　　　　　　　　　　　　　3 Sheets-Sheet 2
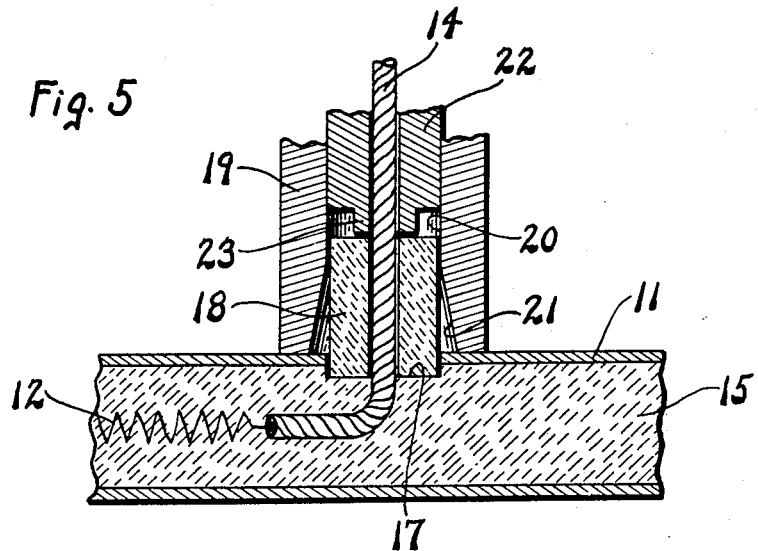
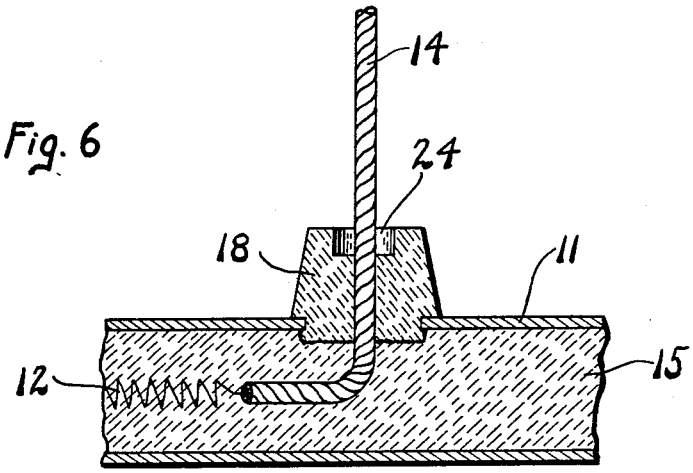
INVENTOR.
DONALD SHERK
BY
Attorney Sept. 20, 1955  D. SHERK  2,718,577
ELECTRIC HEATING DEVICES
Filed Feb. 13, 1953  3 Sheets-Sheet 3

INVENTOR.
DONALD SHERK
BY
Attorney

United States Patent Office 2,718,577
Patented Sept. 20, 1955

2,718,577
ELECTRIC HEATING DEVICES

Donald Sherk, Pittsburgh, Pa., assignor to Edwin L. Wiegand Company, Pittsburgh, Pa., a corporation of Pennsylvania Application February 13, 1953, Serial No. 336,717

9 Claims. (Cl. 201—67)

My invention relates to electric heating devices, more particularly to means for forming a terminal structure for heating devices, and the principal object of my invention is to provide new and improved devices of this character.

Figure 2:
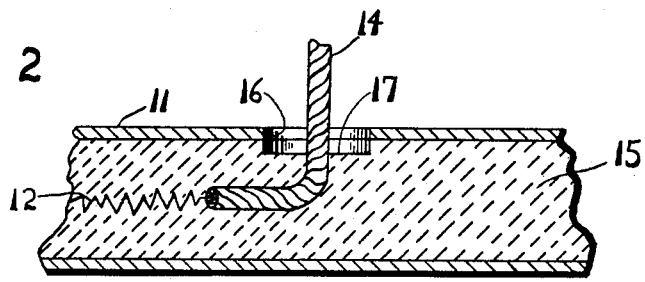
Figure 3:
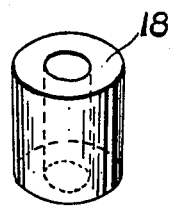
Figure 4:
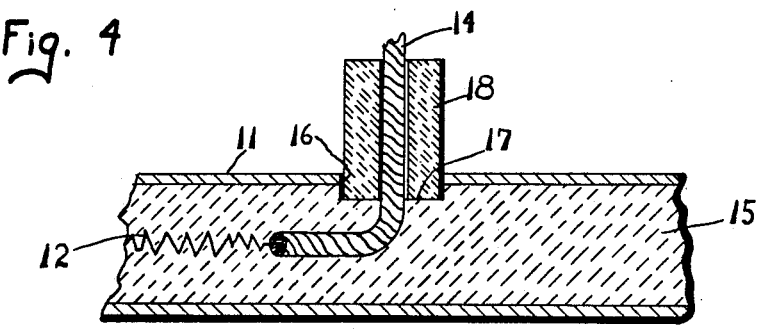
Figure 7:
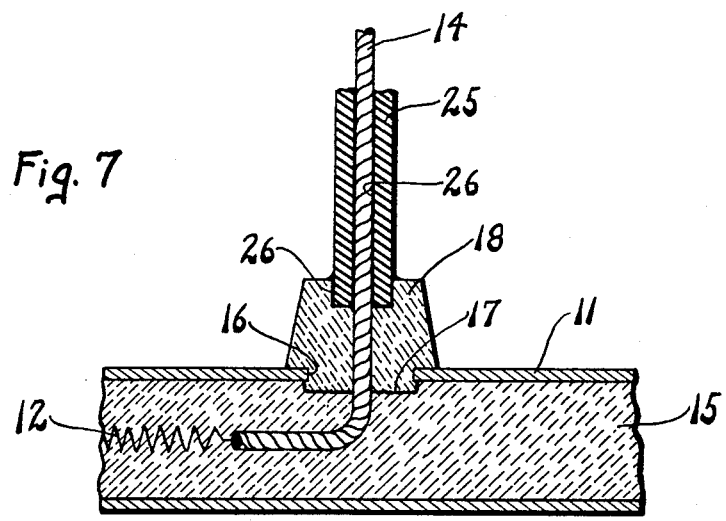
Figure 8:
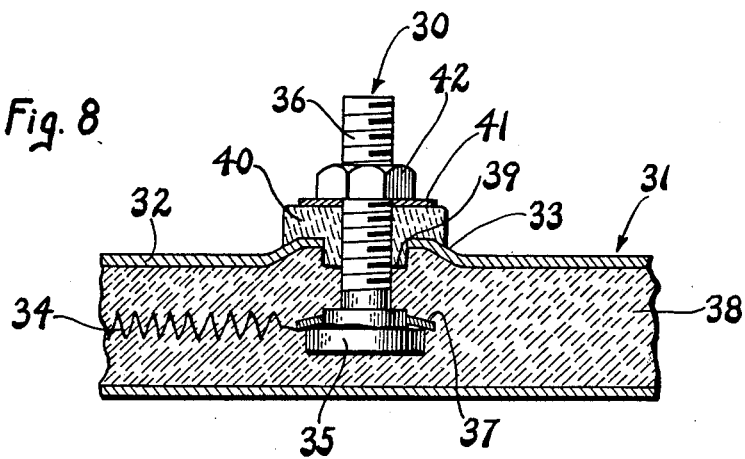

In the drawings accompanying this specification and forming a part of this application, there are shown, for purposes of illustration, several embodiments which my invention may assume, and in these drawings:

Figure 1 is a perspective view of an electric heating device disclosing an embodiment of my invention, Figure 2 is an enlarged fragmentary cross-sectional view through a terminal of the heating device, showing a stage of manufacture of the heating device, Figure 3 is a perspective view of a bushing used in the embodiment of my invention, Figure 4 is a view similar to Figure 2 but with the bushing added, Figure 5 is a view similar to Figure 4 but showing molding apparatus used to mold the bushing, Figure 6 is a view similar to Figure 5 but with the molding apparatus removed and the bushing molded, Figure 7 is a view similar to Figure 6 but showing an electric insulating cover applied to the terminal wire, and Figure 8 is a fragmentary sectional view of another embodiment of the invention.

With particular reference to Figures 1 through 7, the embodiment of the invention therein disclosed is shown as applied to an electric heater 10 such, for example, as the ring unit shown in Figure 1.

In accordance with usual construction, the electric heater comprises a metallic sheath 11 formed in any desired manner and enclosing the usual resistor 12 designed for the passage of an electric current and the consequent generation of the desired heat and also enclosing part of the terminal 14 of the resistor. In the present embodiment a terminal 14 is secured to each end of the resistor 12 and the terminals extend from a side of the sheath and in juxtaposition, as shown in Figure 1.

In the present embodiment, and for purposes later to appear, it is preferred to form the terminal 14 with a surface that provides interstices of some sort, such as an undulating surface, for example, formed by a twisted wire lead as shown. The twisted wire, of course, also provides flexibility which in many cases is desirable.

Refractory material 15 embeds the resistor 12 and the inner end of the terminal 14 and serves to electrically insulate the resistor element and the terminal from the sheath and to conduct heat from the resistor element to the sheath. Preferably, the refractory material is granular in form, clay bonded, and highly compacted within the sheath in any suitable manner.

The sheath 11 is formed with an opening 16 through which a respective terminal 14 extends and the opening is here shown as of a diameter considerably larger than the diameter of the terminal. The refractory material is formed with a well 17 at each opening 16, and in the present embodiment the well is of a diameter substantially equal to the diameter of the respective opening.

Each terminal of the heating device is similar and accordingly the following description refers to one terminal, it being understood that such description applies to both terminals herein shown.

The means for forming the terminal structure comprises an insulating covering which has engagement with the refractory material defining the well 17 and also has engagement with the adjacent part of the terminal 14. In the presently disclosed embodiment, a bushing 18 is formed of a ceramic material. The bushing 18 may be cylindrical, as shown in Figure 3, for ease of production, and is somewhat plastic so that it may be molded by pressure to fill the well 17.

It has been found that a suitable bushing may be formed of a moist mixture of zircon, talc, clay and glass frit, and the following is an example of one mixture found suitable for the purpose:

| | Per cent |
|---|---|
| Granular zircon | 50 |
| Clay | 25 |
| Talc | 10 |
| Glass frit | 15 |
| | 100 |

Moisture is added in an amount suitable to make the mixture self supporting when molded to pellet form, and in the above proportions it was found that about 12% of water was sufficient for the purpose. If desired, the mixture may be aged, and pellets in the shape of bushings 18 may be formed in any suitable manner, such as in a pellet machine.

A bushing 18 is inserted over the extending part of the terminal 14 and is disposed in position within the well 17, as shown in Figure 4. Suitable dies may then be arranged to press and mold the bushing to final shape.

As seen in Figure 5, a cylindrical die body 19 may be held positioned with respect to the sheath at its opening 16, the die body having an interior diameter 20 to closely receive the bushing 18 and a flared annular wall 21 for a purpose to be described. A plunger 22 is movable within the die body and has a reduced extremity 23 adapted to form a recess 24 (see Figure 6) in the terminating wall of the bushing 18.

As the plunger 22 is moved inwardly of the die body 19, the bushing is molded, under pressure, so that its inner portion is squeezed into the well 17 and into engagement with the refractory material defining the well. The glass frit forms a satisfactory bonding material to suitably adhere with the refractory material and the molding pressure may cause the inner portion of the bushing to bulge and slightly underlie the annular metal lip defined by the opening 16 in the sheath.

The bushing 18 is bulged exteriorly of the sheath by pressure forcing its exterior portion to occupy the concave portion 21 of the die body so that the bushing overhangs the annular metal lip defined by the opening 16 in the sheath and the bushing is thus locked tightly in place. The molding pressure on the bushing also forces the latter into tight engagement with the adjacent exterior surface of the terminal 14, and the bushing material is caused to flow into the interstices in the surface of the terminal (in the present embodiment the undulations formed by the twisted wire) to further lock the assembly.

The material of the bushing may be cured by heat, and the glass frit and clay bonds all particles of the body together to form a porous, hard ceramic body. The glass bonds the ceramic to the sheath and to the refractory 15 and provides a terminal structure having considerable mechanical strength.

As shown in Figure 7, an insulating covering 25 is slipped over the extending end of the terminal and has its end seating in the recess 26. The terminal 14 may be of varying lengths, depending upon requirements, and the insulating covering may be of a length suitable for such requirements. The covering 25 may be of any material suitable for electric insulating purposes and one material which has been used and found satisfactory is a sleeving formed of woven glass impregnated with silicone rubber or resin.

The sleeving may fit adjoining parts with sufficient adherence to provide the necessary insulation and seal but preferably the sleeving is cemented in place, as shown by the cement indicated by the heavy lines 26 in Figure 7. One method presently preferred, of securing the sleeving in place is to coat that portion of the terminal 14 in the vicinity of the bushing with a cement and then slipping the sleeving over the terminal, such action of the sleeving causing it to distribute the cement over the terminal and extrude some into the recess 24 and cause it to flow about the exterior of the sleeving. The cement may be a resinous material and one form presently preferred is a self-curing amine reacted epoxy resin. When the cement has set, the lower end of the sleeve is sealed within the recess 24 and the sleeve is sealed and securely bonded to the terminal 14 by reason of the cement flowing into and filling the undulations formed by the twisted wire of the terminal.

In Figure 8 the invention is shown applied to the terminal 30 of a strip heater 31. In this case, the sheath 32 may be formed with an outwardly struck portion 33 margining the sheath opening through which the terminal extends. The end of the resistor 34 is clamped to the head 35 of the terminal, which is here shown in the form of a bolt 36, by means of a clamping washer 37.

Refractory material 38 embeds the resistor 34 and the inner portion of the terminal and, as before, is formed with a well 39. A bushing 40, similar to the bushing 18, is pressure-molded to position to lock with opposite surfaces of the sheath at the annular lip formed by the sheath opening, and also to engage the refractory and the terminal. A washer 41 and nut 42 may be threaded onto the exterior of the bolt for the purpose of securing a conductor lead to the terminal.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. In an electric heating device including resistor means having a terminal and sheath means enclosing said resistor means and provided with an opening through which said terminal extends, the method of forming a support for the terminal which comprises molding an insulating covering about and in engagement with said terminal and the surfaces defining said opening with at least a portion of said insulating covering being directed outwardly of said sheath means and extending around an adjacent portion of said terminal, forming a recess in the outwardly directed portion of said covering in circumscribing relation with respect to said terminal, and disposing and sealing an insulating covering about said terminal and at least in part within said recess.

2. In an electric heating device including resistor means having a terminal, sheath means enclosing said resistor means and provided with an opening through which said terminal extends, and refractory material insulating said resistor means and said terminal from said sheath means and providing a well at said opening, the method of forming a support for the terminal which comprises disposing a plastic ceramic bushing about said terminal exteriorly of said sheath means and molding said bushing under pressure to extend within and without said sheath means, the molding operation urging the inner portion of said bushing to engagement with the refractory material defining said well and the inner and outer parts of said bushing being squeezed into engagement with said terminal and the outer part having a recess formed therein margining said terminal, and disposing and sealing an insulating covering about said terminal and at least in part within said recess.

3. In an electric heating device including resistor means having a twisted wire terminal, sheath means enclosing said resistor means and provided with an opening through which said terminal extends, and refractory material insulating said resistor means and said terminal from said sheath means and providing a well at said opening, the method of forming a support for the terminal which comprises forming a bushing from a mixture comprising zircon, talc, clay and glass frit, disposing said bushing about said terminal exteriorly of said sheath means, molding said bushing under pressure to extend within and without said sheath means, the molding operation urging the inner portion of said bushing to engagement with the refractory material defining said well and the inner and outer parts of said bushing being squeezed into engagement with said terminal and the outer part having a recess formed therein margining said terminal, coating said terminal with a plastic sealing compound, and disposing a tubular insulating covering over said terminal to position its leading end in said recess, the disposing operation urging said sealing compound to enter said recess and seal said leading end in said recess.

4. An electric heating device, comprising resistor means having a terminal formed with an undulated surface, sheath means enclosing said resistor means and provided with an opening through which said terminal extends, refractory material insulating said resistor means and said terminal from said sheath means and providing a well at said opening, a ceramic plug molded in position about said terminal to engage with the undulated surface of an adjoining part of said terminal, said ceramic plug having an inner portion within said sheath means and filling said well and an outer portion extending from said sheath means and having a recess in its terminal wall and margining an extending part of said terminal, and an insulating covering about said extending part of said terminal and having an end sealed in position within said recess.

5. An electric heating device, comprising resistor means having a twisted wire terminal, sheath means enclosing said resistor means and provided with an opening through which said terminal extends, refractory material insulating said resistor means and said terminal from said sheath means and providing a well at said opening, a ceramic closure comprising a bushing formed of zircon, talc, clay and glass frit, said bushing being molded in position about said terminal to engage with the undulated surface formed by the twisted wires of said terminal and having an inner portion within said sheath means and filling said well and bonding to the refractory material defining said well and also having an outer portion extending from said sheath means and having a recess in its terminal wall and margining an extending part of said terminal, an insulating covering about said extending part of said terminal and having an end disposed within said recess, and sealing material between said terminal and said covering and sealing said end of said covering within said recess.

6. The method of forming a rigid support for the resistor terminal of an electric heating device of the type having rigid sheath means enclosing the resistor and provided with an opening through which said resistor terminal extends and having granular refractory material insulating said resistor from said sheath, a portion of said granular refractory material being accessible through said sheath opening, said method comprising disposing a deformable bushing having ceramic properties over said resistor terminal, deforming said bushing under pressure to press an inner portion thereof against the refractory material accessible through said sheath opening and to press said bushing laterally and tightly against said resistor terminal, and baking the deformed bushing to harden it and cause said inner portion to bond with the adjoining refractory material, whereby said bushing forms a rigid terminal support which is rigidly held assembled with said heating element.

7. The method of forming a rigid support for the resistor terminal of an electric heating device of the type having rigid sheath means enclosing the resistor and provided with an opening through which said resistor terminal extends and having granular refractory material insulating said resistor from said sheath, a portion of said granular refractory material being accessible through said sheath opening, said method comprising disposing a deformable bushing having ceramic properties over said resistor terminal, deforming said bushing under pressure to press an inner portion thereof against the refractory material accessible through said sheath opening and to spread an outer portion thereof to engage and overhang the sheath surface margining said opening, and to press said bushing laterally and tightly against said resistor terminal, and baking the deformed bushing to harden it and cause said inner portion to bond with the adjoining refractory material, whereby said bushing forms a rigid terminal support which is rigidly locked to the sheath of said heating element.

8. The method of forming a rigid support for the resistor terminal of an electric heating device of the type having rigid sheath means enclosing the resistor and provided with an opening through which said resistor terminal extends and having granular refractory material insulating said restistor from said sheath, a portion of said granular refractory material being accessible through said sheath opening, said method comprising disposing a deformable bushing having ceramic properties over said resistor terminal, deforming said bushing under pressure to press an inner portion thereof against the refractory material accessible through said sheath opening and to spread an outer portion thereof to overhang the sheath surface margining said opening and to press said bushing laterally and tightly against said resistor terminal, said deforming operation also forming a recesss in said outer portion which margins said resistor terminal, baking the deformed bushing to harden it and cause said inner portion to bond with the adjoining refractory material, whereby said bushing forms a rigid terminal support which is rigidly locked to the sheath of said heating element, disposing an insulating covering over that part of said resistor terminal which extends outward of said bushing with an end of said covering seating within said recess, and cementing said covering to said resistor terminal and to the wall surfaces of said bushing which defines said recess.

9. An electric heating device, comprising resistor means having a terminal, rigid sheath means enclosing said resistor means and provided with an opening through which said terminal extends, a refractory insulating material insulating said resistor means and said terminal from said sheath means, a portion of said granular refractory material being accessible through said sheath opening, and a ceramic plug about said resistor terminal and extending through said sheath opening and having an inner portion bonded to said refractory material and an outer portion engaging and overhanging the sheath surface margining said sheath opening, whereby said bushing forms a rigid terminal support which is rigidly locked to the sheath of said heating element.

References Cited in the file of this patent

UNITED STATES PATENTS

| | | |
|---|---|---|
| 1,708,961 | Abbott | Apr. 16, 1929 |
| 1,992,787 | Sutton | Feb. 26, 1935 |
| 2,106,604 | Jagger | Jan. 25, 1938 |
| 2,431,951 | Mauerer | Dec. 2, 1947 |
| 2,617,001 | Hasley | Nov. 4, 1952 |
| 2,617,002 | Hasley | Nov. 4, 1952 |